United States Patent
Paramasivam et al.

(10) Patent No.: US 11,342,628 B2
(45) Date of Patent: May 24, 2022

(54) BATTERY PACK ARRAY FRAMES WITH INTEGRATED FASTENER HOUSINGS

(71) Applicant: FORD GLOBAL TECHNOLOGIES, LLC, Dearborn, MI (US)

(72) Inventors: Saravanan Paramasivam, South Lyon, MI (US); Steve Droste, Ypsilanti, MI (US); Rajaram Subramanian, Ann Arbor, MI (US); Kimberley King, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 189 days.

(21) Appl. No.: 16/583,450

(22) Filed: Sep. 26, 2019

(65) Prior Publication Data

US 2020/0020905 A1  Jan. 16, 2020

Related U.S. Application Data

(62) Division of application No. 15/365,050, filed on Nov. 30, 2016, now Pat. No. 10,431,785.

(51) Int. Cl.
| | |
|---|---|
| *H01M 50/258* | (2021.01) |
| *B60L 50/64* | (2019.01) |
| *H01M 50/20* | (2021.01) |
| *H01M 50/244* | (2021.01) |
| *H01M 50/211* | (2021.01) |
| *H01M 50/249* | (2021.01) |
| *H01M 50/264* | (2021.01) |
| *H01M 10/6554* | (2014.01) |

(52) U.S. Cl.
CPC .......... *H01M 50/258* (2021.01); *B60L 50/64* (2019.02); *H01M 50/20* (2021.01); *H01M 50/211* (2021.01); *H01M 50/244* (2021.01); *H01M 50/249* (2021.01); *H01M 50/264* (2021.01); *H01M 10/6554* (2015.04); *H01M 2220/20* (2013.01)

(58) Field of Classification Search
None
See application file for complete search history.

(56) References Cited

U.S. PATENT DOCUMENTS

| | | |
|---|---|---|
| 5,049,457 A | 9/1991 | Niksa et al. |
| 7,727,667 B2 | 6/2010 | Sakurai |
| 8,460,815 B2 | 6/2013 | Oury et al. |

(Continued)

FOREIGN PATENT DOCUMENTS

| | | |
|---|---|---|
| DE | 102012224041 A1 | 6/2013 |
| JP | 2002141036 A * | 5/2002 |
| WO | 2014034057 A1 | 3/2014 |

OTHER PUBLICATIONS

EPO Website (www.espacenet.com) machine translation of the detailed description of JP 2002-141036A. (Year: 2002).*

Primary Examiner — Gregg Cantelmo
(74) Attorney, Agent, or Firm — David B. Kelley; Carlson, Gaskey & Olds, P.C.

(57) ABSTRACT

A battery pack includes a support structure, an array frame including a fastener housing, and a fastener received through the fastener housing for mounting the array frame to the support structure. The array frame may be mounted to the support structure using a top-down approach that includes inserting a fastener through a fastener housing of the array frame.

20 Claims, 7 Drawing Sheets

(56) References Cited

U.S. PATENT DOCUMENTS

| | | |
|---|---|---|
| 8,574,740 B2 | 11/2013 | Quick et al. |
| 2006/0246350 A1* | 11/2006 | Takayama ............ H01M 10/625 |
| | | 429/178 |
| 2008/0318119 A1 | 12/2008 | Watanabe et al. |
| 2010/0003589 A1 | 1/2010 | Yoda et al. |
| 2010/0112424 A1* | 5/2010 | Hayashi .............. H01M 16/006 |
| | | 429/99 |
| 2010/0306995 A1 | 12/2010 | Scheuerman |
| 2011/0293982 A1* | 12/2011 | Martz ................. H01M 10/613 |
| | | 429/120 |
| 2012/0107659 A1 | 5/2012 | Phlegm et al. |
| 2012/0121959 A1* | 5/2012 | Yamada ................... B60K 1/04 |
| | | 429/100 |
| 2012/0312614 A1* | 12/2012 | Fujiwara .............. H01M 50/20 |
| | | 180/68.5 |
| 2012/0321934 A1 | 12/2012 | Hopkins et al. |
| 2013/0164577 A1 | 6/2013 | Insana et al. |
| 2014/0050966 A1* | 2/2014 | Merriman ......... H01M 10/0481 |
| | | 429/156 |
| 2015/0017504 A1* | 1/2015 | Isshiki ................... B60L 50/61 |
| | | 429/120 |

\* cited by examiner

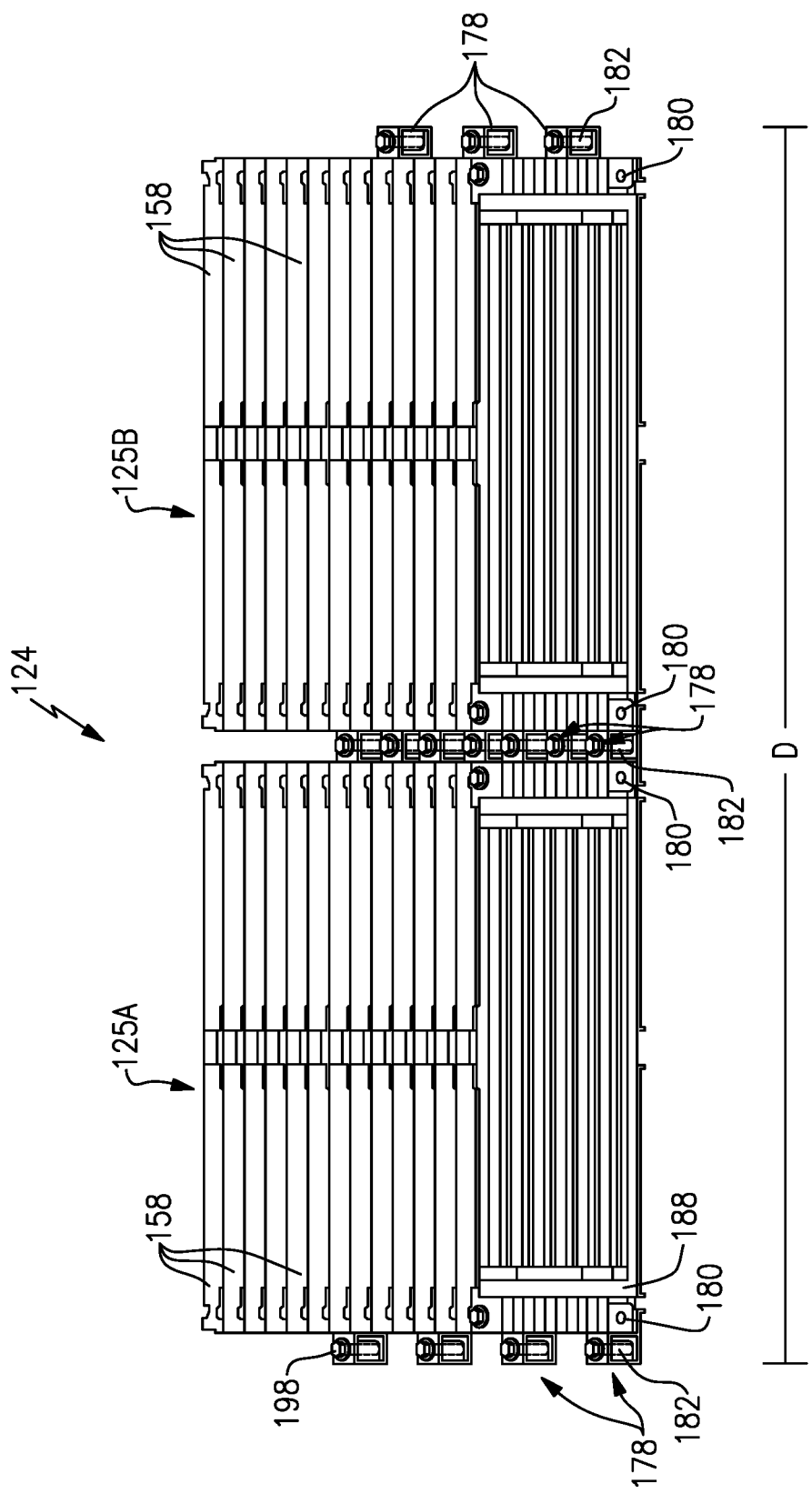

BATTERY PACK ARRAY FRAMES WITH INTEGRATED FASTENER HOUSINGS

CROSS REFERENCE TO RELATED APPLICATION

This is a divisional of U.S. patent application Ser. No. 15/365,050, filed on Nov. 30, 2016, which is now U.S. Pat. No. 10,431,785.

TECHNICAL FIELD

This disclosure relates to battery packs for electrified vehicles. An exemplary battery pack includes an array frame having a fastener housing. The fastener housing is configured to receive a fastener for mounting the array frame to a support structure of the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that store energy for powering these electrical loads. The battery cells are often packaged together in one or more assemblies using various support structures such as frames, spacers, rails, walls, plates, bindings, etc. There is often a limited amount of space available within a vehicle for accommodating the battery pack. Space efficient designs are therefore desirable in this field of technology.

SUMMARY

A battery pack according to an exemplary aspect of the present disclosure includes, among other things, a support structure, an array frame including a fastener housing, and a fastener received through the fastener housing for mounting the array frame to the support structure.

In a further non-limiting embodiment of the forgoing battery pack, a battery cell is housed within a pocket of the array frame.

In a further non-limiting embodiment of either of the foregoing battery packs, the support structure is a tray of an enclosure assembly.

In a further non-limiting embodiment of any of the foregoing battery packs, a second array frame is connected to the array frame.

In a further non-limiting embodiment of any of the foregoing battery packs, the second array frame includes a second fastener housing that is configured differently than the fastener housing.

In a further non-limiting embodiment of any of the foregoing battery packs, the second array frame includes a second fastener housing that is configured the same as the fastener housing.

In a further non-limiting embodiment of any of the foregoing battery packs, the fastener housing includes a first opening and a second opening.

In a further non-limiting embodiment of any of the foregoing battery packs, the first opening is configured to receive a rod and the second opening is configured to receive the fastener.

In a further non-limiting embodiment of any of the foregoing battery packs, the first opening extends along a first axis and the second opening extends along a second axis, and the first axis is perpendicular to the second axis.

In a further non-limiting embodiment of any of the foregoing battery packs, the array frame is disposed along a longitudinal axis, and the first axis and the second axis are both perpendicular to the longitudinal axis.

In a further non-limiting embodiment of any of the foregoing battery packs, the array frame includes a top wall, a bottom wall, and a frame arm that extends between the top wall and the bottom wall.

In a further non-limiting embodiment of any of the foregoing battery packs, the fastener housing is disposed at a junction between the frame arm and the bottom wall.

In a further non-limiting embodiment of any of the foregoing battery packs, the fastener housing is disposed at a junction between the frame arm and the top wall.

In a further non-limiting embodiment of any of the foregoing battery packs, the fastener housing is disposed near a top of the array frame, and a second fastener housing is disposed near a bottom of the array frame.

In a further non-limiting embodiment of any of the foregoing battery packs, the fastener housing is nested between fastener housings of an adjacent array frame.

A method according to another exemplary aspect of the present disclosure includes, among other things, positioning an array frame relative to a support structure of a battery pack, and using a top-down approach, mounting the array frame to the support structure. Mounting the array frame includes inserting a fastener through a fastener housing of the array frame.

In a further non-limiting embodiment of the foregoing method, the fastener housing includes a first opening and a second opening, and mounting the array frame includes inserting the fastener through the second opening.

In a further non-limiting embodiment of either of the foregoing methods, mounting the array frame includes inserting a rod through the first opening.

In a further non-limiting embodiment of any of the foregoing methods, using the top-down approach includes moving the fastener in a direction that extends from a top wall of the fastener housing toward a bottom wall of the fastener housing.

In a further non-limiting embodiment of any of the foregoing methods, the support structure is a tray of an enclosure assembly of the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 8 illustrates portions of another battery pack.

DETAILED DESCRIPTION

This disclosure details various battery pack designs for use within electrified vehicles. An exemplary battery pack includes a support structure and an array frame mounted to the support structure. The array frame includes a fastener housing configured to receive a fastener. Using a top down approach, the fastener may be inserted through the fastener housing to mount the array frame to the support structure. These and other features are discussed in greater detail in the following paragraphs of this detailed description.

Figure 1:
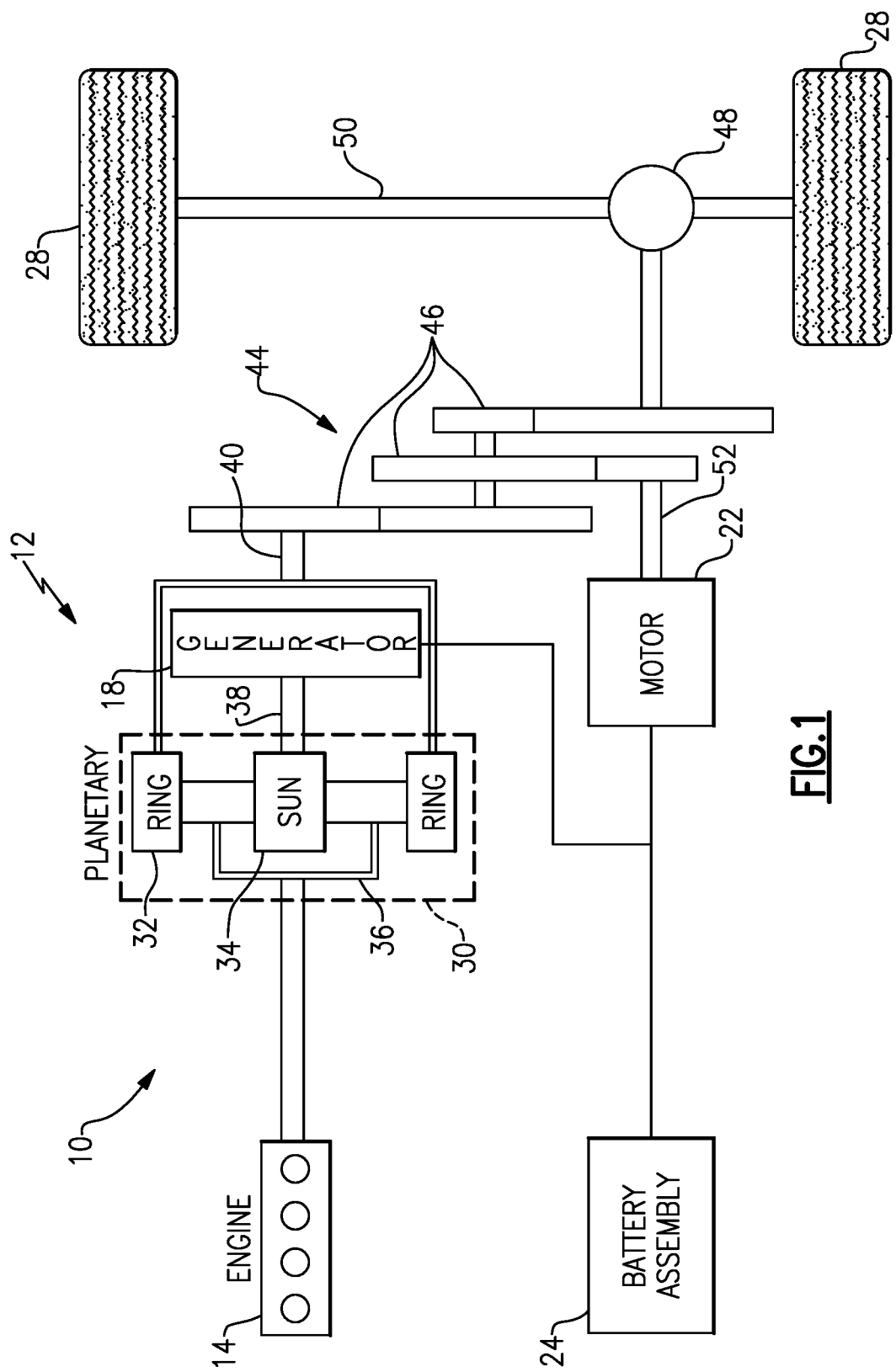
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18 and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
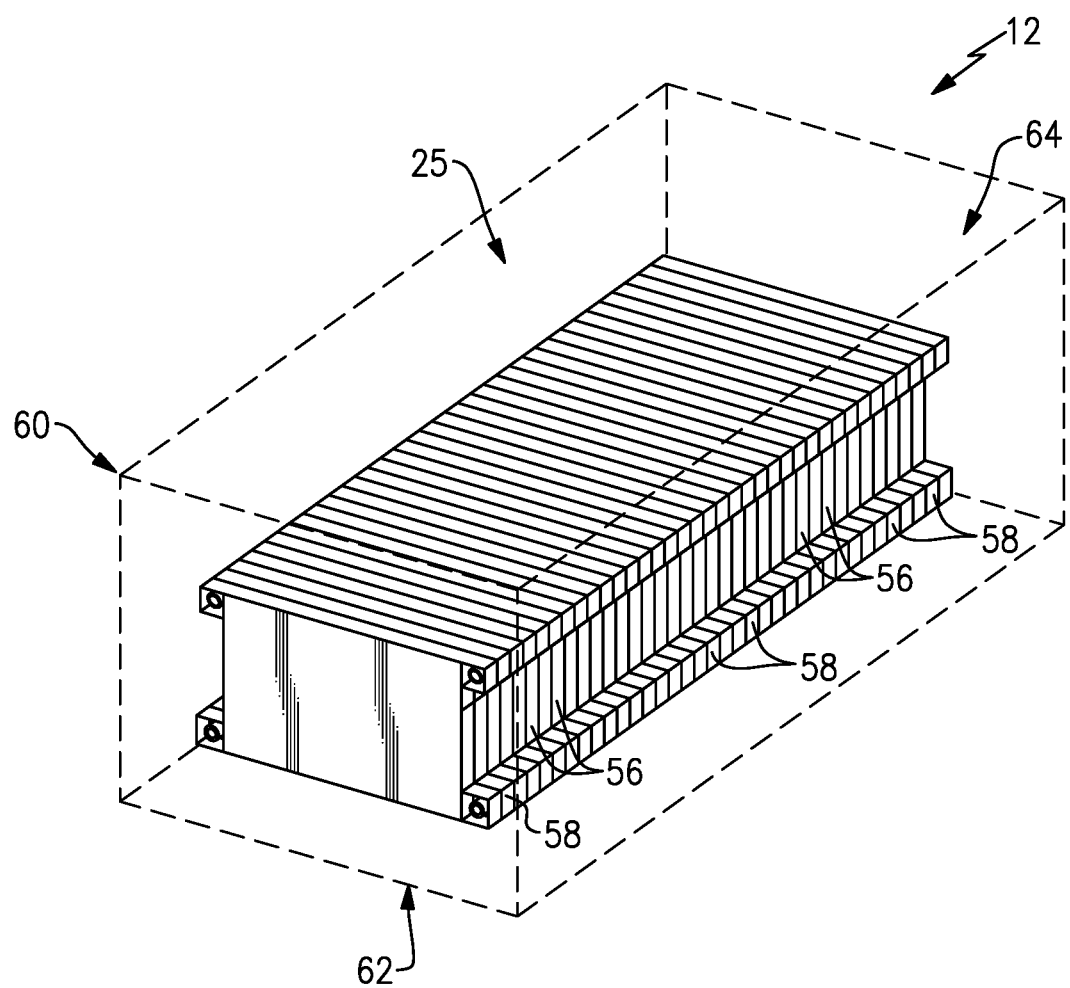
FIG. 2 illustrates a battery pack of an electrified vehicle.

FIG. 2 illustrates a battery pack 24 that can be employed within an electrified vehicle. For example, the battery pack 24 could be part of the electrified vehicle 12 of FIG. 1. FIG. 2 is a perspective view of the battery pack 24, and its external components (e.g., enclosure assembly 60) are shown in phantom to better illustrate the internal components of the battery pack 24.

The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the configuration shown in FIG. 2.

The battery cells 56 may be stacked side-by-side to construct a grouping of battery cells 56, sometimes referred to as a "cell stack." The battery pack 24 can include one or more separate groupings of battery cells 56. The battery cells 56 may include any geometry (prismatic, cylindrical, pouch, etc.) and any chemistry (lithium-ion, nickel-metal hydride, lead-acid, etc.).

The battery cells 56, along with any support structures (e.g., frames, spacers, rails, walls, plates, bindings, etc.), may collectively be referred to as a battery assembly 25. The battery cells 56 are retained relative to one another by a plurality of array frames 58. Although the battery pack 24 of FIG. 2 is depicted as having a single battery assembly 25, the battery pack 24 could include a greater number of battery assemblies within the scope of this disclosure. In addition, although depicted as extending longitudinally inside the battery pack 24, the battery assembly 25 could alternatively be arranged to extend horizontally inside the battery pack 24.

An enclosure assembly 60 houses each battery assembly 25 of the battery pack 24. In a non-limiting embodiment, the enclosure assembly 60 is a sealed enclosure that includes a tray 62 and a cover 64. The cover 64 is secured to the tray 62 to enclose and seal the battery assembly 25 of the battery pack 24.

Figure 3:
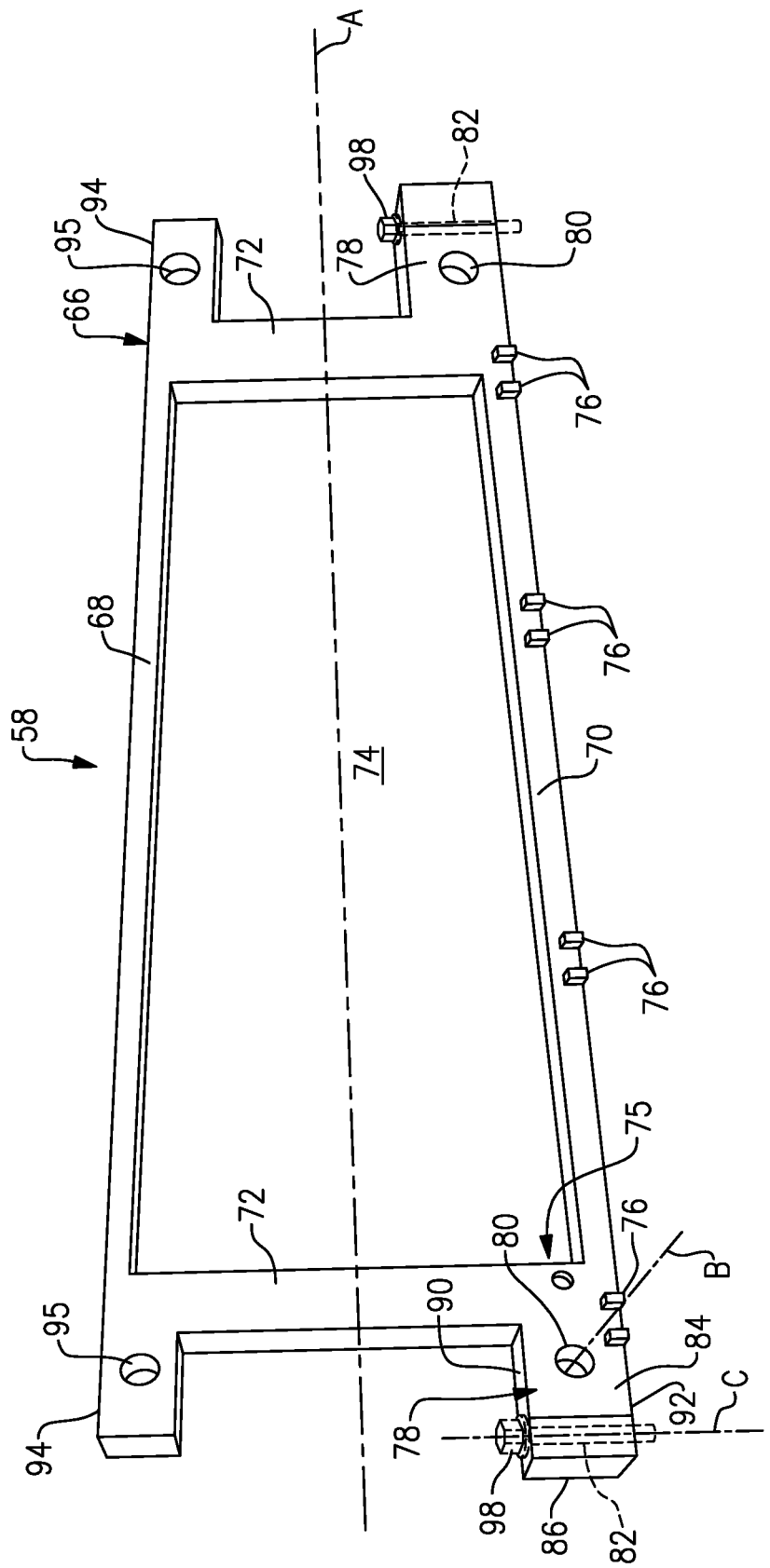
FIG. 3 illustrates an array frame according to a first embodiment of this disclosure.
Figure 4:
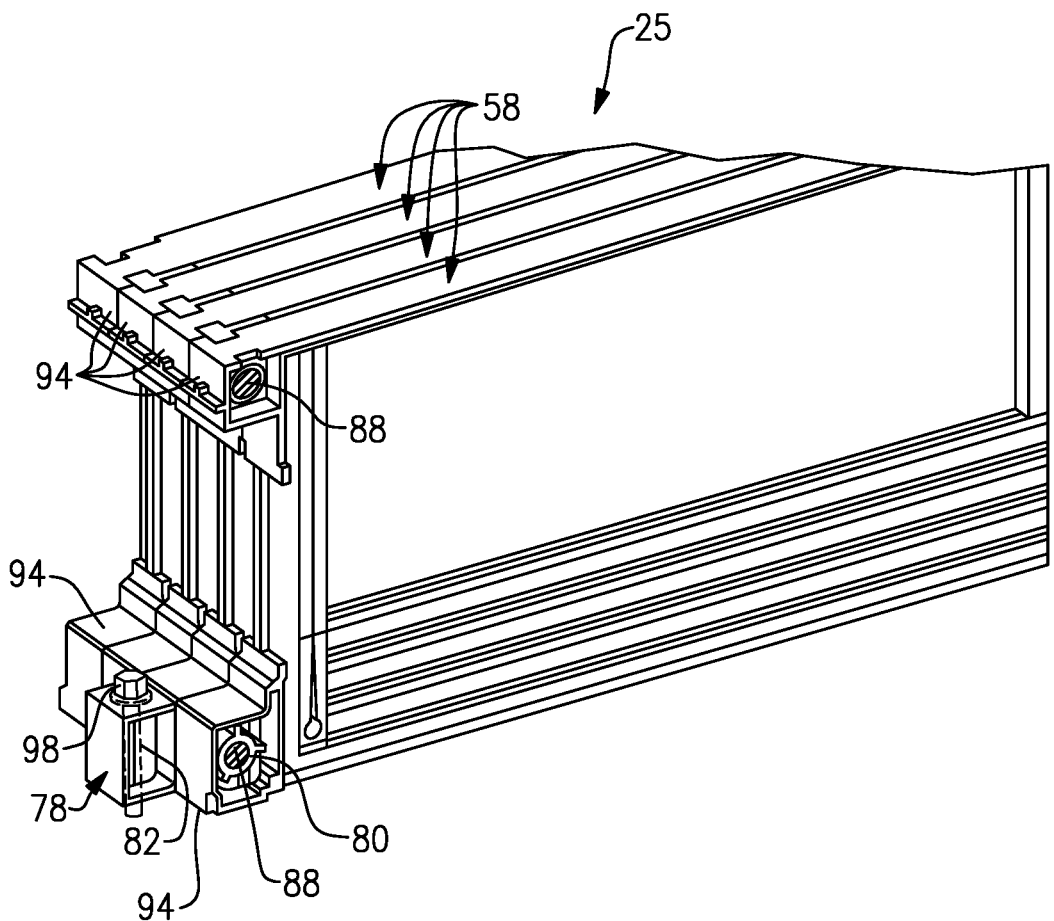
FIG. 4 illustrates multiple array frames stacked together to build a battery assembly.
Figure 5:
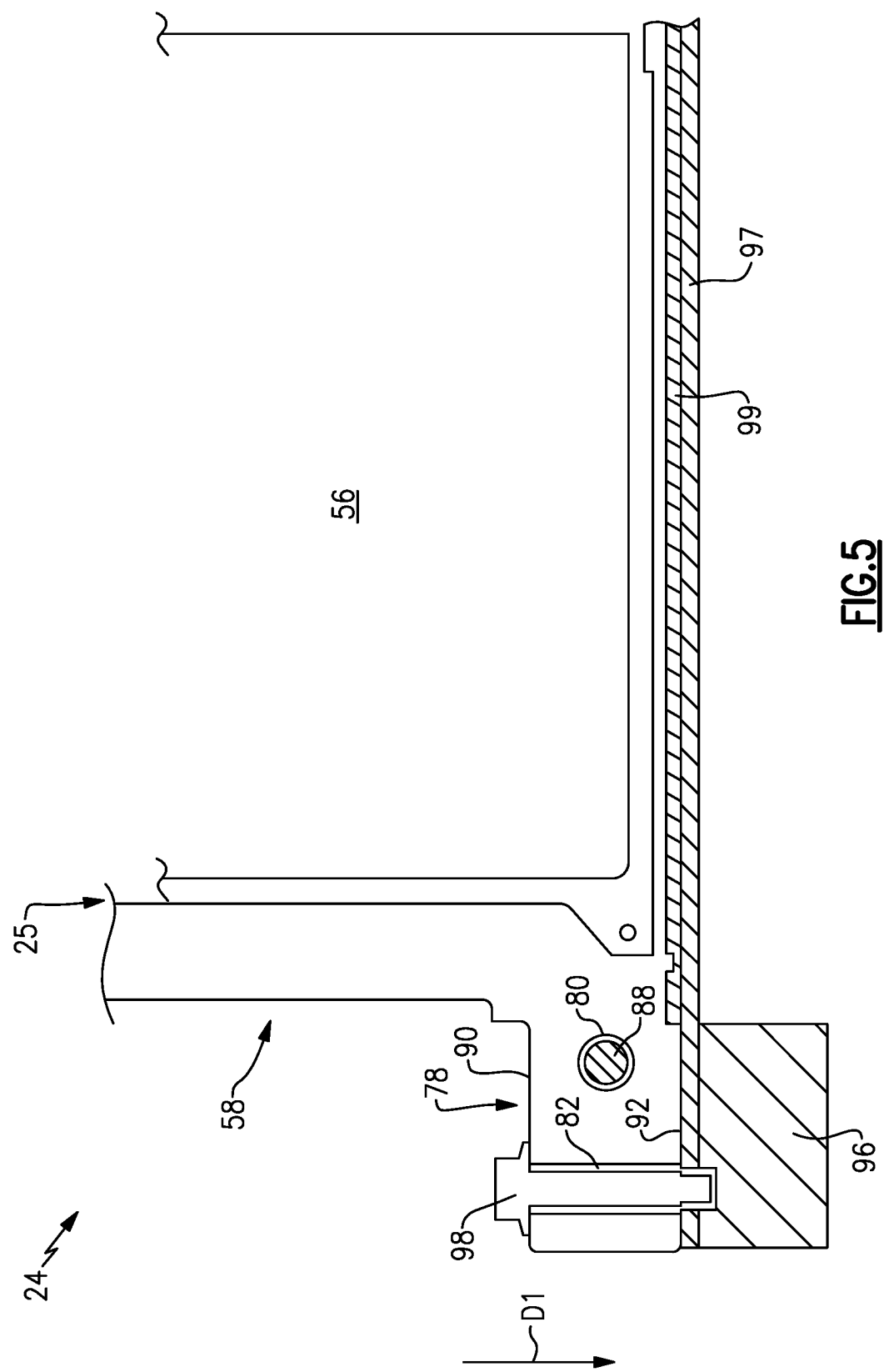
FIG. 5 is a cross-sectional view depicting portions of a battery pack.

FIGS. 3, 4 and 5 illustrate an exemplary array frame 58 of the battery assembly 25 of FIG. 2. The array frame 58 includes a frame body 66 disposed along a longitudinal axis A. The frame body 66 includes a top wall 68, a bottom wall 70, and frame arms 72 that connect between the top wall 68 and the bottom wall 70. In a non-limiting embodiment, the frame arms 72 are disposed at the longitudinal extents of the top wall 68 and the bottom wall 70. The top wall 68, the bottom wall 70, and the frame arms 72 establish a perimeter around an opening 74 formed through the frame body 66. In a non-limiting embodiment, the top wall 68 and the bottom wall 70 extend horizontally and in parallel with the longitudinal axis A, and the frame arms 72 extend vertically and transverse to the longitudinal axis A.

The frame body 66 of the array frame 58 may be a unitary, plastic structure. In a non-limiting embodiment, the top wall 68, the bottom wall 70, and the frame arms 72 are molded, cast, machined or otherwise manufactured to form the unitary structure.

Each opposing side of the frame body 66 includes a pocket 75. Although not shown, a fin structure may be positioned within the opening 74 to separate the pockets 75 from one another. The pockets 75 may be sized and shaped to receive a battery cell (see feature 56 of FIGS. 2 and 5, for example). The array frame 58 may house either one or two battery cells, with each pocket 75 being capable of receiving a single battery cell. In a non-limiting embodiment, the battery cells 56 are pouch cells for a high voltage battery assembly. A non-limiting example of a suitable pouch battery cell is a lithium-ion polymer battery. However, other types of battery cells are also contemplated within the scope of this disclosure.

A plurality of retention features 76 may be integrated into the top wall 68, the bottom wall 70, and/or the frame arms 72 for connecting the array frame 58 to an adjacent array frame. The retention features 76 may engage corresponding retention features of adjacent array frames to build a battery assembly. It should be understood that the battery assemblies of this disclosure are not limited to any specific number of array frames or battery cells.

The array frame 58 may additionally include one or more fastener housings 78. The fastener housings 78 are integrated features of the frame body 66 of the array frame 58. The fastener housings 78 may protrude from the frame arms 72 in a direction away from a center of the frame body 66. In a first non-limiting embodiment, the fastener housings 78 are disposed at a bottom of the frame arms 72 (e.g., near a junction between the frame arms 72 and the bottom wall 70).

Each fastener housing 78 includes a first opening 80 and a second opening 82. The first opening 80 extends through the fastener housing 78. For example, the first opening 80 may extend along an axis B between opposing side walls 84, 86 of the fastener housing 78. In a non-limiting embodiment, the axis B is perpendicular to the longitudinal axis A. The first opening 80 is configured to receive a rod 88 (see, e.g., FIGS. 4 and 5).

The second opening 82 also extends through the fastener housing 78, and may extend along an axis C between a top wall 90 and a bottom wall 92 of the fastener housing 78. In a non-limiting embodiment, the axis C is perpendicular to both the longitudinal axis A and the axis B and extends vertically in parallel with the frame arms 72. The second opening 82 is configured to receive a fastener 98 for mounting the array frame 58 to a support structure (see, e.g., FIG. 5).

In another non-limiting embodiment, the array frame 58 includes second fastener housings 94 that protrude from the frame arms 58 at an end opposite from the fastener housings 78. The second fastener housings 94 include a single opening 95 for receiving another rod 88. However, in this non-limiting embodiment, the second fastener housings 94 lack additional openings for receiving fasteners for mounting the array frame 58 to a support structure.

Referring now primarily to FIG. 4, a plurality of array frames 58 may be stacked side-by-side to build a battery assembly 25 (battery cells of assembly not shown for clarity). In this non-limiting embodiment, only one frame of the grouping of array frames 58 includes the fastener housing 78 having both the first openings 80 and the second opening 82. The remaining array frames 58 could include only the second fastener housings 94 (i.e., are only configured to receive rods 88). It may only be necessary to provide the fastener housings 78 at the locations where the battery assembly 25 needs fastened down.

Other configurations are also contemplated, including configurations in which each array frame 58 of an assembly includes at least one of the fastener housings 78. The total amount and locations of the fastener housings 78 of the battery assembly 25 will depend on many design factors, including but not limited to the overall length of the battery assembly 25.

FIG. 5 illustrates portions of a battery pack 24 that includes at least one array frame 58 that include the fastener housings 78. The array frame 58 may be positioned relative to a support structure 96 of the battery pack 24. In a non-limiting embodiment, the support structure 96 is a tray of an enclosure assembly of the battery pack 24.

A rod 88 may be inserted through the first opening 80 of the fastener housing 78 to connect the array frame 58 with additional array frames of a battery assembly 25. The rod 88 imparts compression across the battery assembly 25. In addition, a fastener 98 may be inserted through the second opening 82 for mounting the array frame 58, and thus the battery assembly 25, to the support structure 96.

In an exemplary, non-limiting embodiment, the fastener 98 may be inserted using a top-down approach. For example, the fastener 98 can be inserted in a direction D1 that extends in a direction from the top wall 90 toward the bottom wall 92 of the fastener housing 78. With respect to the battery pack 24 as a whole, the direction D1 extends from a cover (not shown) of the battery pack 24 toward the support structure 96. The top-down approach simplifies the assembly of the battery pack 24.

In a first non-limiting embodiment, the fastener 98 is a shoulder bolt. In a second non-limiting embodiment, the fastener 98 includes a bolt and sleeve assembly. The fastener 98 functions as a compression limiter for retaining the battery assembly 25 to the support structure 96 inside the battery pack 24.

The array frame 58 may also be positioned in proximity to a heat exchanger plate 97, sometimes referred to as a cold plate. The heat exchanger plate 97 is configured to conduct heat out of the battery cells 56. In other words, the heat exchanger plate 97 acts as a heat sink to remove heat from the heat sources (i.e., the battery cells 56) during certain conditions. The heat exchanger plate 97 could alternatively be configured to add heat to the battery cells 56, such as during relatively cold ambient conditions.

A thermal interface material (TIM) 99 may be disposed between the array frame 58 and the heat exchanger plate 97. The TIM 99 maintains thermal contact between the array frame 58 and the heat exchanger plate 97 and increases the thermal conductivity between these neighboring components during heat transfer events. The TIM 99 may be any known thermally conductive material.

Figure 6:
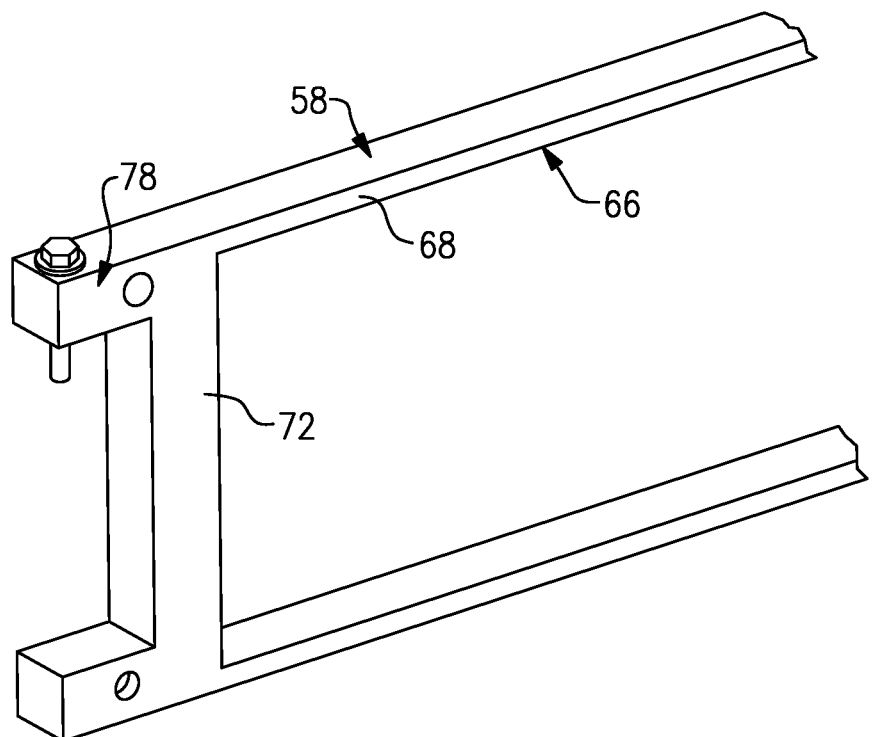
FIG. 6 illustrates an array frame according to a second embodiment of this disclosure.

The array frame 58 described above may embody various other configurations. For example, as shown in FIG. 6, the fastener housing 78 may be disposed at a top of the frame arms 72 (e.g., near a junction between the frame arms 72 and the top wall 68 of the frame body 66).

Figure 7:
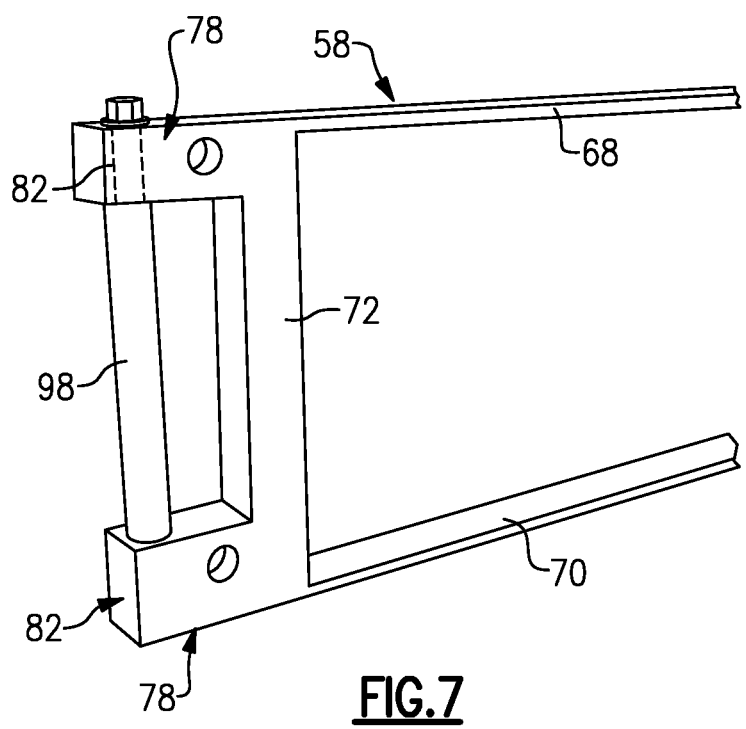
FIG. 7 illustrates an array frame according to a third embodiment of this disclosure.

In yet another non-limiting embodiment, shown in FIG. 7, the fastener housings 78 are disposed at both the tops and bottoms of the frame arms 72 (e.g., near a junction between the frame arms 72 and both the top wall 68 and the bottom wall 70). In other words, each frame arm 72 may include both a top and bottom fastener housing 78. A fastener 98 can be inserted through second openings 82 of both fastener housings 78 to mount the array frame 58 to a support structure.

FIG. 8 illustrates portions of another exemplary battery pack 124. The battery pack includes a first battery assembly 125A and a second battery assembly 125B nested with the first battery assembly 125A. Each of the first and second battery assemblies 125A, 125B include a plurality of array frames 158 and a plurality of battery cells (not shown for clarity).

A portion of the array frames 158 of both the first battery assembly 125A and the second battery assembly 125B include fastener housings 178. The fastener housings 178 include both first openings 180 for receiving rods 188 and second openings 182 for receiving fasteners 198. The fastener housings 178 of the first battery assembly 125A are offset from the fastener housings 178 of the second battery assembly 125B. In this way, when the second battery assembly 125B is moved into position adjacent to the first battery assembly 125A, the fastener housings 178 of the second battery assembly 125B nest between the fastener housings 178 of the first battery assembly 125A. The ability to nest the first and second battery assemblies 125A, 125B in this manner helps reduce a width dimension D of the battery pack 124.

The exemplary array frames of this disclosure provide a more efficient packaging density by combining functions (e.g., battery cell retention, mounting, etc.) traditionally performed by multiple parts into a single, integrated unit. The array frames occupy less volume and reduce the amount of part-to-part clearances that exist inside the battery pack.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   positioning a first array frame relative to a support structure of a battery pack;
   using a top-down approach, mounting the first array frame to the support structure,
   wherein mounting the first array frame includes inserting a fastener through a first fastener housing of the first array frame; and
   inserting a rod through the first fastener housing without using the top-down approach,
   wherein a battery cell is held within a pocket of the first array frame.

2. The method as recited in claim 1, wherein the first fastener housing includes a first opening and a second opening, and mounting the first array frame includes:
   inserting the fastener through the second opening.

3. The method as recited in claim 2, wherein mounting the first array frame includes:
   inserting the rod through the first opening.

4. The method as recited in claim 2, wherein the first opening extends along a first axis and the second opening extends along a second axis that is perpendicular to the first axis.

5. The method as recited in claim 1, wherein using the top-down approach includes:
   moving the fastener in a direction that extends from a top wall of the first fastener housing toward a bottom wall of the first fastener housing.

6. The method as recited in claim 5, wherein the bottom wall is closer to the support structure than the top wall.

7. The method as recited in claim 5, wherein a heat exchanger plate is positioned between the bottom wall of the first fastener housing and the support structure.

8. The method as recited in claim 1, wherein the support structure is a tray of an enclosure assembly of the battery pack.

9. The method as recited in claim 1, wherein the support structure is a heat exchanger plate.

10. The method as recited in claim 1, wherein a second array frame is connected to the first array frame.

11. The method as recited in claim 10, wherein a third array frame is connected to the second array frame.

12. The method as recited in claim 11, wherein the first fastener housing is nested between a second fastener housing of the second array frame and a third fastener housing of the third array frame.

13. The method as recited in claim 1, wherein using the top-down approach includes:
moving the fastener in a direction that extends from a cover of the battery pack toward the support structure.

14. The method as recited in claim 1, wherein the fastener is a shoulder bolt.

15. The method as recited in claim 1, wherein the fastener is a bolt and sleeve assembly.

16. The method as recited in claim 1, wherein the fastener is configured as a compression limiter for retaining the first array frame to the support structure.

17. The method as recited in claim 1, wherein inserting the rod includes:
imparting a compression force across the first array frame and at least one additional array frame.

18. The method as recited in claim 1, wherein a first direction of insertion of the fastener is different from a second direction of insertion of the rod.

19. A method, comprising:
mounting a first array frame to a support structure of a battery pack,
wherein a battery cell is held within a pocket of the first array frame,
wherein mounting the first array frame to the support structure includes:
inserting a fastener through a second opening of a fastener housing of the first array frame; and
inserting a rod through a first opening of the fastener housing,
wherein the first opening extends along a first axis and the second opening extends along a second axis that is transverse to the first axis.

20. A method, comprising:
positioning a first array frame relative to a support structure of a battery pack,
wherein a second array frame is connected to the first array frame and a third array frame is connected to the second array frame;
using a top-down approach, mounting the first array frame to the support structure,
wherein mounting the first array frame includes inserting a fastener through a fastener housing of the first array frame; and
inserting a rod through the fastener housing without using the top-down approach.

* * * * *